(12) United States Patent
Chan et al.

(10) Patent No.: US 11,327,453 B2
(45) Date of Patent: May 10, 2022

(54) STATUS INDICATOR FOR A BUILDING CONTROLLER

(71) Applicant: Honeywell International Inc., Morris Plains, NJ (US)

(72) Inventors: FoongYeen Chan, Petaling Jaya (MY); Ke Zhang, Beijing (CN); Cary Leen, Hammond, WI (US); Andrew D. Halford, Manchester, MD (US); Timo Tapio Pihlajasaari, Gelnhausen (DE); Sanjoy Bhattacharjee, Kolkata (IN); Roy Kolasa, Kansas City, MO (US); Duo Zhang, Beijing (CN); Evan J. Kingston, Bellbowrie (AU)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/120,255

(22) Filed: Sep. 1, 2018

(65) Prior Publication Data
US 2020/0073346 A1 Mar. 5, 2020

(51) Int. Cl.
*G05B 19/00* (2006.01)
*G05B 19/042* (2006.01)
*G08B 5/36* (2006.01)

(52) U.S. Cl.
CPC ............ *G05B 19/042* (2013.01); *G08B 5/36* (2013.01); *G05B 2219/2614* (2013.01)

(58) Field of Classification Search
None
See application file for complete search history.

(56) References Cited

U.S. PATENT DOCUMENTS

| | | |
|---|---|---|
| 7,649,472 B1 | 1/2010 | Paterno |
| 9,532,437 B1 | 12/2016 | Zhang |
| 9,587,848 B2 | 3/2017 | Adamik et al. |
| 9,786,294 B1 * | 10/2017 | Bezos ................. G06F 3/167 |
| 9,804,610 B2 | 10/2017 | Sloo et al. |
| 9,892,692 B2 | 2/2018 | Nageli et al. |
| 2012/0151399 A1 | 6/2012 | Soerensen et al. |
| 2013/0303263 A1 * | 11/2013 | LeMay ............... G07F 17/3225 |
| | | 463/25 |
| 2015/0054652 A1 | 2/2015 | Crochet |
| 2015/0096352 A1 * | 4/2015 | Peterson ............. G08B 21/182 |
| | | 73/31.02 |
| 2015/0097666 A1 * | 4/2015 | Boyd ..................... G08B 21/12 |
| | | 340/517 |
| 2015/0159895 A1 | 6/2015 | Quam et al. |
| 2016/0261425 A1 | 9/2016 | Horton et al. |
| 2017/0162007 A1 | 6/2017 | Boyd et al. |

(Continued)

OTHER PUBLICATIONS

EP19194800.9 Extended European Search Report, pp. 8, dated Jan. 30, 2020.

*Primary Examiner* — Paul B Yanchus, III
(74) *Attorney, Agent, or Firm* — Seager, Tufte & Wickhem, LLP

(57) ABSTRACT

A relatively simple status indicator for a building control device that helps the user more quickly and intuitively identify the operation status of the building control system and more quickly troubleshoot faults and/or other problems that may occur within the building control system. This may help reduce the cost of maintain the building control system and may help reduce unwanted downtime of the building control system.

17 Claims, 4 Drawing Sheets

(56) References Cited

U.S. PATENT DOCUMENTS

2017/0352259 A1   12/2017  Bruck et al.
2018/0114434 A1    4/2018  Newman, Jr. et al.
2019/0251831 A1*  8/2019  Wheeler ................. H04L 12/10

* cited by examiner

| Animation | Light Ring Color - Green | Light Ring Color - Yellow | Light Ring Color - Red |
|---|---|---|---|
| | | | 106 |
| | 102 | 104 | |
| | Normal<br>- The Device is Healthy<br>- Activity in Progress<br><br>No Action Required | Attention<br>- There are some faults but operation is not affected<br>- Communication Failure/Faults<br><br>Need Action from User | URGENT/HIGH ALERT<br>- Major Failure & Impacts Operation/Breakdown<br>- Factory Default<br>- Diagnostic Mode<br>Urgently Need Attention |
| Solid | Everything Calm and in Control<br><u>102a</u> | | Factory Default - No Application Loaded <u>106a</u><br><br>No Configuration In Controller |
| Breathing | Everthing Calm and in Control (Redundant Controller) <u>102b</u> | | |
| Flashing | | Communication Failure (e.g. I/O Modules, MSTP Devices, Channel, etc. <u>104a</u> | Controller Application Failure, e.g. RACL Stop Running, Firmware <u>106b</u> |
| Slow Rotating (Clockwise) | In Progress (e.g. Pairing Wifi, Controller Download <u>102c</u> | Solid if Failure, Fault <u>104b</u> | In Bootloader or Diagnostic Mode <u>106c</u> |
| Fast Rotating (Clockwise) | | | Restart/Boot Up <u>106d</u> |

STATUS INDICATOR FOR A BUILDING CONTROLLER

TECHNICAL FIELD

The present disclosure pertains to building control devices. More particularly, the present disclosure pertains to a status indicator for a building control device that provides an indication to a user of a current operating status of the building control device.

BACKGROUND

Building control systems are used to control one or more systems of a building, and often include one or more building control devices that control one or more building control components. Such building control systems can include Heating, Ventilation and/or Air Conditioning (HVAC) systems, building security systems, building lighting control systems and/or any other suitable building control system. In many instances, a building control system includes a main controller that receives sensor and/or other data, and in response, provides control signals to control various building control components in accordance with a control algorithm. In some cases, the main controller may be operatively coupled to one or more input/output modules, which may be wired or otherwise connected to the one or more building control components. The number and/or type of input/output modules may depend on the size, capability and/or configuration of the building control system.

Often because of cost considerations, many such building control systems do not have a dot matrix display, or have a small dot matrix display with left/right/up/down/center-enter keys/buttons to find/see if any faults/alarms exist. Once a fault/alarm is found, the criticality of the fault/alarm may need to be identified by using a best practice guide or system manual. Alternatively, or in addition, a few individual Light Emitting Diodes (LEDs) may be provided that flash in certain programmed sequences to convey the current operational status of the building control system and/or any detected faults. However, this requires the user decode the often cryptic programmed sequence of flashes to properly identify the current operational status and/or faults within the building control system. This again often requires reference to a best practice guide or system manual. Not only can these processes be time consuming, tedious and error prone process, they can make it difficult to troubleshoot and correct detected faults within the building control system, which can increase the cost of maintaining the building control system.

What would be desirable is a relatively simple status indicator for a building control device that helps the user more quickly and intuitively identify the operation status of the building control system and more quickly troubleshoot faults and/or other problems that may occur within the building control system. This may help reduce the cost of maintain the building control system and may help reduce unwanted downtime of the building control system.

SUMMARY

The present disclosure discloses to a relatively simple status indicator for a building control device that helps the user more quickly and intuitively identify the operation status of the building control system and more quickly troubleshoot faults and/or other problems that may occur within the building control system. This may help reduce the cost of maintain the building control system and may help reduce unwanted downtime of the building control system.

In one example, a building control device includes a housing, an input/output block for passing control signals used for controlling one or more building control components, a status indicator visible from outside of the housing, where the status indicator includes a light ring, and a controller housed by the housing and operatively coupled to the input/output block and the status indicator. The controller may be configured to identify a current status of the building control device. The current status can indicate, for example, no faults are identified that require user action, non-critical faults are identified that require user action, or critical faults are identified that require urgent user action. Based on this, the controller can be programmed to cause the light ring to display a first color when the current status indicates no faults are identified that require user action, a second color when the current status indicates non-critical faults are identified that require user action, and a third color when the current status indicates critical faults are identified that require urgent user action.

In some cases, the controller is further configured to animate the light ring to provide further information regarding the current status. In some cases, the light ring may include a light diffuser that defines the light ring shape, with three or more spaced light sources behind the light diffuser. Each light source may include, for example, three LED's each of a different color. In some cases, the light ring diffuser may be circular or toroidal in shape, and there may be six or more equally spaced light sources arranged along the light ring diffuser. This structure may allow the light ring to display a variety of animations that may convey different information to the user. For example, by turning the light sources of a first color on sequentially around the light ring, the status indicator may appear as a spot or segment rotating around the light ring. By varying the intensity of the light sources of the first color, the status indicator may appear as a spot with a trailing tail rotating around the light ring. By reversing the sequence, the status indicator may appear to be rotating around the light ring in the opposite direction. By increasing or decreasing the speed of the sequence, the status indicator may appear to rotate faster or slower around the light ring. In another example, the light intensity of all of the light sources of the first color may be repeatedly cycled together, progressively increasing the light intensity of the light ring followed by progressively decreasing the light intensity of the light ring. This animation may emulating a breathing pattern. In some cases, the light intensity of all of the light sources of the first color may be repeatedly cycled on and then off. This animation may emulate a flashing pattern. In some cases, all of the light sources of the first color may be left on, thereby displaying the light ring in a solid pattern. It is contemplated that these and other animations may be performed in different colors, or combination of colors, if desired.

In another example, a building control device includes a housing, an input/output block for passing control signals used for controlling one or more building control components, a status indicator visible from outside of the housing, wherein the status indicator including a light ring, and a controller housed by the housing and operatively coupled to the input/output block and the status indicator. The controller may be configured to select an animation of the light ring from two or more animations to convey information regarding a current status of the building control device. In some cases, the controller is further configured to select a color from two or more colors to convey information regarding the current status of the building control device.

In another example, a modular building control system includes a first device having a first housing and a first status indicator visible from outside of the first housing, wherein the first status indicator including a first light ring, and a second device having a second housing and a second status indicator visible from outside of the second housing, wherein the second status indicator including a second light ring. The first light ring may be dimensioned larger than the second light ring. The second device may be selectively operatively connected to the first device, and the first device is configured to select an animation and/or color for the first light ring to convey information regarding a current status of the first device, and the second device is configured to select an animation and/or color for the second light ring to convey information regarding a current status of the second device. In some cases, the first device is a main controller of the modular building control system, and the second device is an input/output module of the modular building control system. The input/output module may be operatively coupled to the main controller, and the main controller may have a higher rank in the control hierarchy of the modular building control system than the input/output module. In some cases, the main controller and the input/output module are configured to be mounted to a common DIN rail. These are just examples.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description in connection with the accompanying drawings, in which:

FIG. 4 is a table showing an illustrative mapping between certain status conditions of a building control device and corresponding light ring colors and/or animations.

Figure 1:
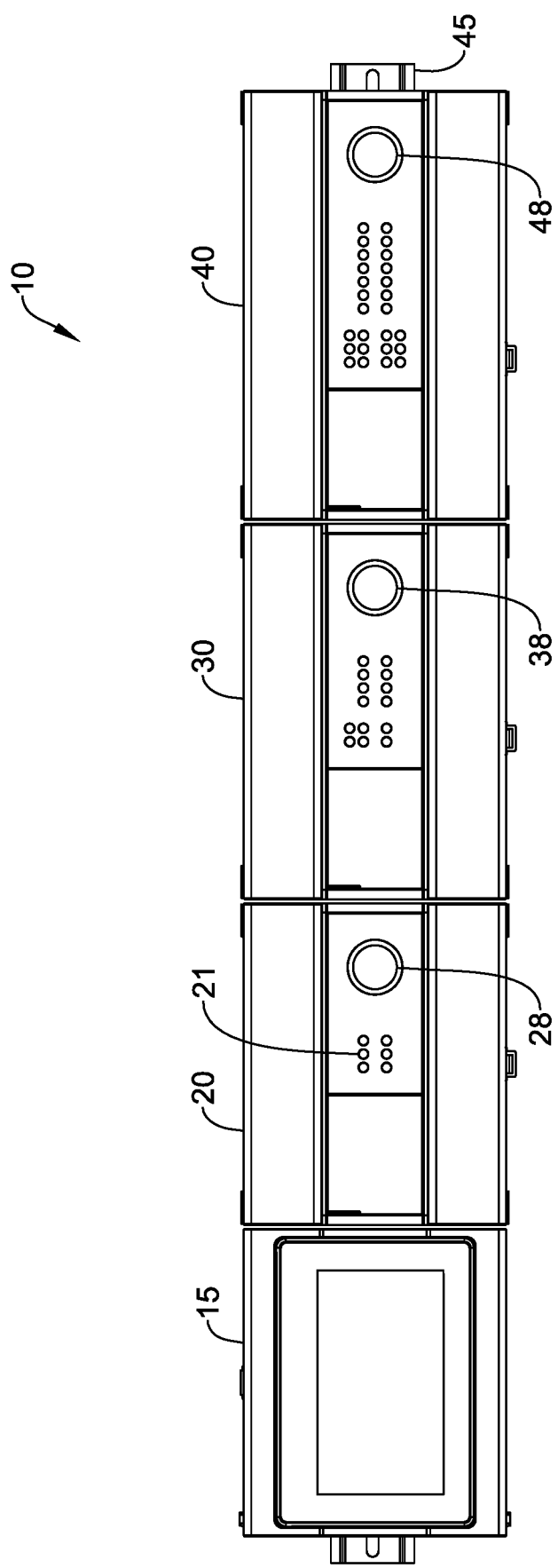
FIG. 1 is diagram of an illustrative building control system.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used connection with other embodiments whether or not explicitly described unless clearly stated to the contrary.

Referring now to FIG. 1, which shows an illustrative building control system 10 for controlling one or more building control components of a building. The illustrative building control system 10 includes a main controller 20, a small input/output (I/O) module 30, and a large input/output module 40. While a small input/output (I/O) module 30 and a large input/output module 40 are shown in FIG. 1, it is contemplated that the number and/or type of input/output modules may depend on the size, capability and/or configuration of the building control system. In some cases, the building control system 10 may be a modular building control system, where the installer may select which of the modules are appropriate for a particular installation. In some case, the various modules may be secured to a common DIN rail 45. Connections (not shown) may be made between the various modules via mating connectors in the sidewalls of the modules, through the DIN rail 45, through ribbon cables, and/or in any other suitable manner. In this example of FIG. 1, a touchscreen man-machine interface (MMI) 15 is also included.

The main controller 20 may have a higher rank in the control hierarchy of the building control system 10 than the input/output modules 30 and 40. In some cases, the main controller 20 operates and as master and the input/output modules 30 and 40 operates as slaves to the main controller 20. In the example show, the main controller 20 receives sensor and/or other data via the input/output modules 30 and 40, and in response, provides control signals to control various building control components (not shown) in accordance with a control algorithm. The input/output modules 30 and 40 may be wired or otherwise connected to the one or more building control components, such as sensors, actuators, valves, dampers, and/or any other suitable building control component. In some cases, the small input/output modules 30 may have less input/output ports than the large input/output modules 40. The input/output modules 30 and 40 may have analog inputs, digital inputs, analog outputs and/or digital outputs. An installer of the building control system 10 may be charged with selecting an appropriate number and type of input/output modules to accommodate a particular installation. The number and/or type of input/output modules may depend on the size, capability and/or configuration of the building control system. In this sense, the building control system 10 may be considered to be modular. The installer may also be charged with wiring each of the building control component to appropriate inputs and outputs of the selected input/output modules.

Figure 2:
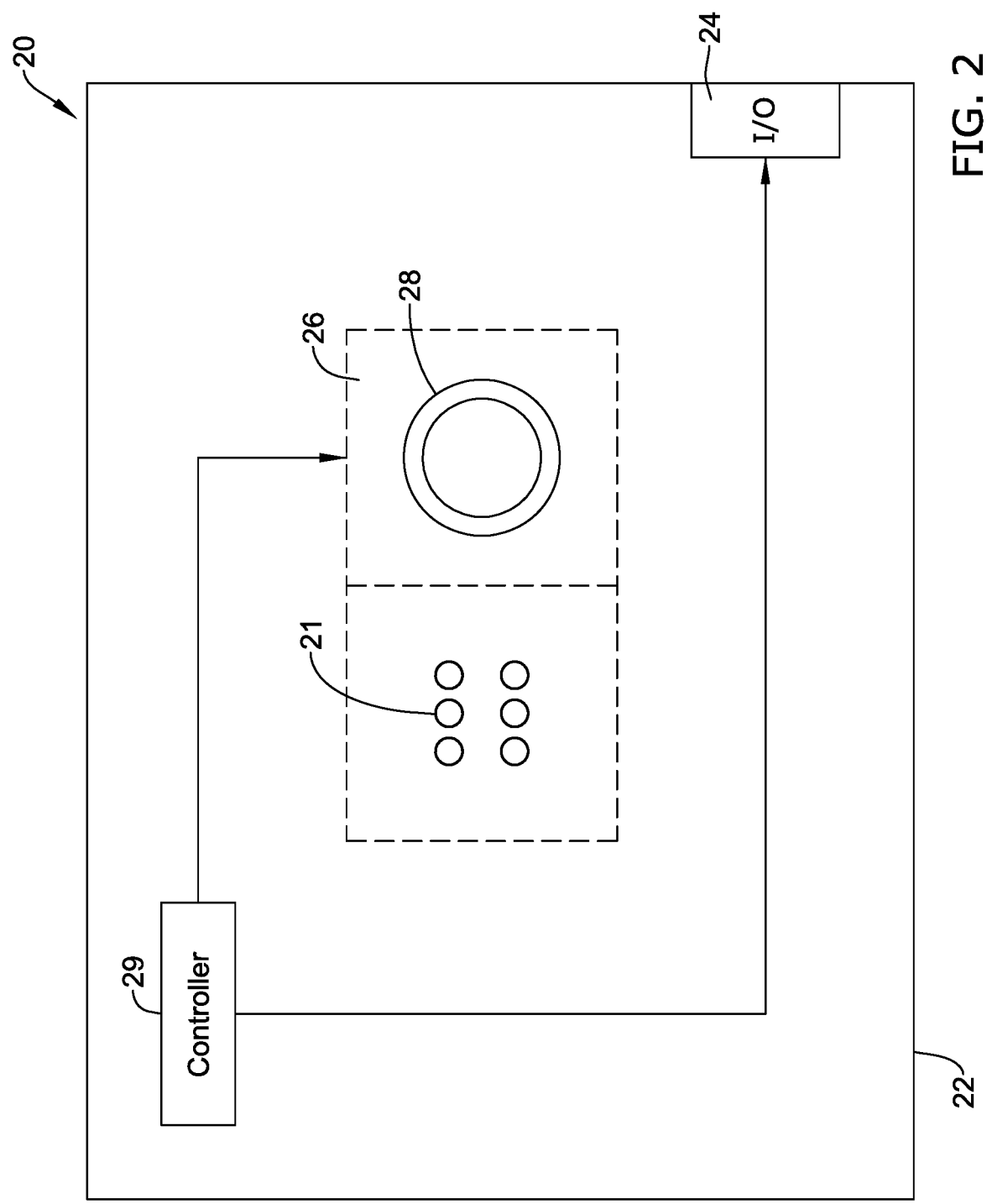
FIG. 2 is an illustrative block diagram of the main controller of the building control system of FIG. 1.

As shown in FIG. 2, the main controller 20 may include a housing 22, an input/output block 24 for passing control signals used for controlling one or more building control components, a status indicator 26 visible from outside of the housing 22, where the status indicator 26 includes a light ring 28, and a controller 29 housed by the housing 22 and operatively coupled to the input/output block 24 and the status indicator 26. The controller 29 may be configured to identify a current status of the building control device 20. The current status can indicate, for example, no faults are identified that require user action, non-critical faults are identified that require user action, or critical faults are identified that require urgent user action. Based on this, the controller 29 can be programmed to cause the light ring 28 to display a first color when the current status indicates no faults are identified that require user action, a second color when the current status indicates non-critical faults are identified that require user action, and a third color when the current status indicates critical faults are identified that require urgent user action.

In some cases, the status indicator 26 may also include a number of LED indicator 21 that indicate which devices are connected to the main controller 20. The small input/output (I/O) module 30 and the large input/output (I/O) module 40 may include similar LED indicators that indicate, for example, which building control components are connected to their analog inputs, digital inputs, analog outputs and/or digital outputs at the given installation.

Figure 3:
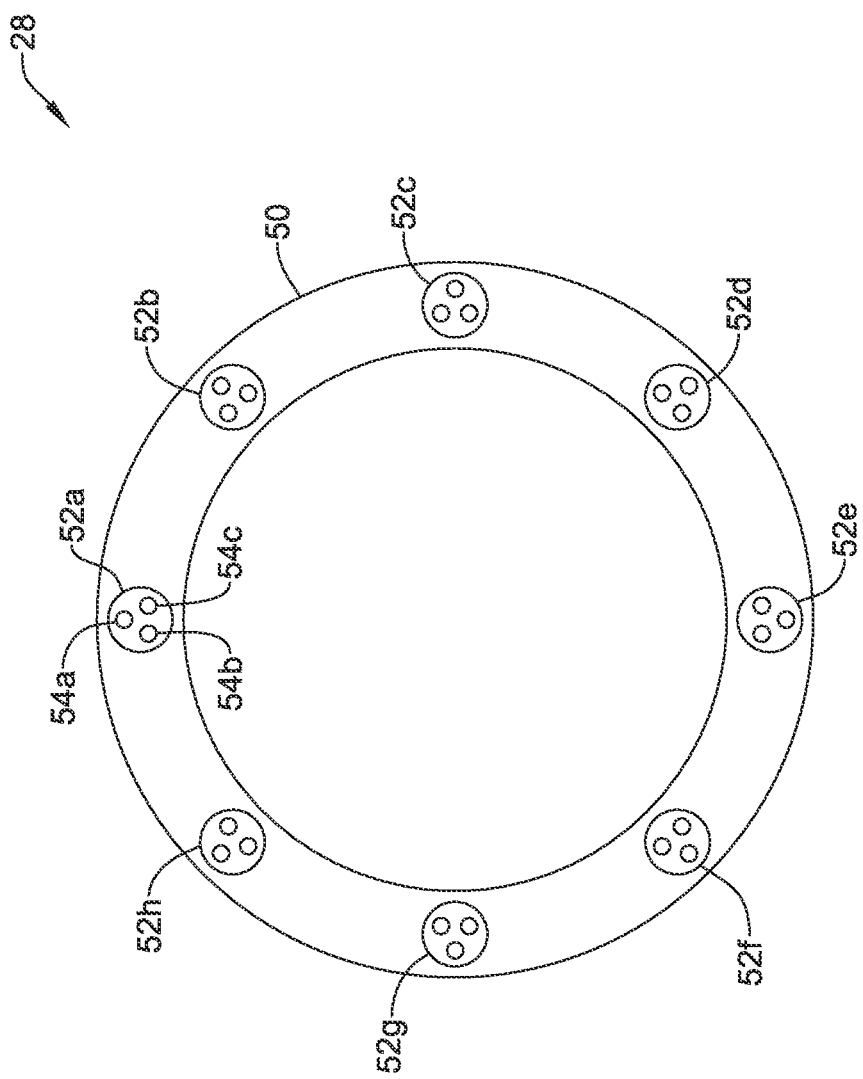
FIG. 3 is an illustrative block diagram of the light ring 28 of FIGS. 1 and 2.

In some cases, the controller 29 of the main controller 20 is further configured to animate the light ring 28 to provide further information regarding the current status. For example, and as best shown in FIG. 3, the light ring 28 may include a light diffuser 50 that defines the light ring shape, with three or more spaced light sources 52a-52h behind the light diffuser. Each light source 52a-52h may include, for example, three LED's 54a-54c each of a different color. In some cases, the light diffuser 50 may be circular or toroidal in shape, and there may be six or more equally spaced light sources 52a-52h arranged along the light diffuser 50. In the example shown, there are eight light sources 52a-52h. In some cases, the light diffuser 50 may be rectangular in shape, triangular in shape, oval in shape, or have any other shape, and in some cases may have an aperture extending therethrough. It is contemplated that the light diffuser 50 may be continuous or may have one or more gaps around the light ring path. In some cases, the light ring 28 may be simply be implemented as an image displayed on a fixed segment or dot matrix display.

Regardless of the particular construction, the light ring 28 may be configured to display a variety of animations that may convey different information to the user. For example, in the construction show in FIG. 3, by turning the light sources 52a-52h of a first color on sequentially around the light diffuser 50, the status indicator may appear as a spot or segment rotating around the light ring 28. By varying the intensity of the light sources 52a-52h of the first color, the status indicator may appear as a spot with a trailing tail rotating around the light ring 28. By reversing the sequence, the status indicator may appear to be rotating around the light ring 28 in the opposite direction. By increasing or decreasing the speed of the sequence, the status indicator may appear to rotate faster or slower around the light ring 28. In another example, the light intensity of all of the light sources 52a-52h of the first color may be repeatedly cycled together, progressively increasing the light intensity of the light ring 28 followed by progressively decreasing the light intensity of the light ring 28. This animation may emulating a breathing pattern. In some cases, the light intensity of all of the light sources of the first color may be repeatedly cycled on and then off. This animation may emulate a flashing pattern. In some cases, all of the light sources 52a-52h of the first color may be left on, thereby displaying the light ring 28 in a solid pattern of the first color. It is contemplated that these and other animations may be performed in different colors, or combination of colors and sequences, as desired.

In some cases, the animation may include repeatedly cycling of the light intensity of the light ring. In some cases, each cycle includes progressively increasing the light intensity of the light ring followed by progressively decreasing the light intensity of the light ring, emulating a breathing pattern. In other cases, each cycle includes turning on the light ring, followed by turning off the light ring, emulating a flashing pattern.

In some cases, the animation includes rotating a lighted portion of the light ring around the light ring in a clockwise direction. In other cases, the animation includes rotating a lighted portion of the light ring around the light ring in a counter-clockwise direction. In some cases, the animation includes rotating a lighted portion of the light ring around the light ring at a first rotation speed. In other cases, the animation includes rotating a lighted portion of the light ring around the light ring at a second rotation speed.

In some cases, the controller 29 of the main controller 20 may be configured to select an animation of the light ring 28 from two or more animations to convey information regarding a current status of the main controller 20. In some cases, the controller 29 is further configured to select a color from two or more colors to convey information regarding the current status of the building control device.

Similar to the main controller 20 shown in FIG. 2-3, the small input/output (I/O) module 30 of FIG. 1 may include a housing, an input/output block for passing control signals used for controlling one or more building control components, a status indicator visible from outside of the housing, where the status indicator includes a light ring 38, and a controller housed by the housing and operatively coupled to the input/output block and the status indicator of the small input/output (I/O) module 30. Likewise, the large input/output (I/O) module 40 of FIG. 1 may include a housing, an input/output block for passing control signals used for controlling one or more building control components, a status indicator visible from outside of the housing, where the status indicator includes a light ring 48, and a controller housed by the housing and operatively coupled to the input/output block and the status indicator of the small input/output (I/O) module 40. It is contemplated that the light ring 38 of the small input/output (I/O) module 30 and the light ring 48 of the large input/output (I/O) module 40 of FIG. 1 may be configured to display a variety of animations that may convey different information to the user, similar to that discussed above with respect to the main controller 20.

In some cases, the light ring 28 of the main controller 20 may be larger than the light ring 38 and the light ring 48 of the small input/output (I/O) module 30 and the large input/output (I/O) module 40. This may convey to the user that the main controller 20 has a higher rank in the control hierarchy of the building control system 10 than the small input/output (I/O) module 30 and the large input/output (I/O) module 40.

FIG. 4 is a table showing an illustrative mapping between certain status conditions of the building control devices and corresponding light ring colors and/or animation. In the example shown, different colors and/or animation of the light ring may be used to indicate status and provide the user with situation awareness. In FIG. 4, row 100 shows the operational status of the building control device (e.g. main controller 20, a small input/output (I/O) module 30, or a large input/output module 40). In some cases, the building control device includes a controller that can identify a current status of the building control device. The current status can indicate, for example, no faults are identified that require user action, non-critical faults are identified that require user action, or critical faults are identified that require urgent user action. Based on this, the controller can be programmed to cause its light ring to display a first color (e.g. green) when the current status indicates no faults are identified that require user action, a second color (e.g. yellow) when the current status indicates non-critical faults are identified that require user action, and a third color (e.g. red) when the current status indicates critical faults are identified that require urgent user action.

In column 102, no faults are identified that require user action, and the building control device is online and operating normally. Under these conditions, the light ring may be displayed in a green color. The light ring may be displayed in a solid green color as shown at 102a, or may be animated in a breathing pattern as shown at 102b. When the building control device is performing an operation, such as pairing with a WiFi network or downloading data and/or updates, the light ring may be animated to show a green spot with a trailing green tail rotating around the light ring at a relatively slow rate until the operation is complete, as shown at 102c.

In column 104, non-critical faults are identified that require user action, but the building control device is online and properly controlling the building control components. In the example shown, the faults are minor enough to not affect operation of the building control system (e.g. short term communication failure). Under these conditions, the light ring may be displayed in a yellow color until the detect faults are resolved by the user. For example, when the main controller 20 has a communication failure with one or more of the small input/output (I/O) module 30 and the large input/output (I/O) module 40, or has difficulty with Master/Slave Token Passing (MSTP), the light ring may be displayed in yellow and may be flashing, as shown at 104a. If one of the small input/output (I/O) module 30 and the large input/output (I/O) module 40 has experienced a failure or fault, the light ring of the main controller 20 may be animated to show a yellow spot with a trailing yellow tail rotating around the light ring at a relatively slow rate, as shown at 104b.

In column 106, critical faults are identified that require urgent user action, and the building control device is not properly controlling the building control system. This can be caused by a major failure or fault that prevents the proper operation of the building control system. It can also be caused when the building control device is placed in a diagnostic mode, or when the building control device is not configured or properly configured. Under these conditions, the light ring may be displayed in a red color until the issue is resolved by the user. The light ring may be displayed in solid red when, for example, the building control device does not have an application loaded, or no configuration has been loaded into the controller, as shown at 106a. The light ring may flash red when, for example, a controller application failure occurs such as a router based application list (RACL) stops running, or an issue with firmware occurs, as shown at 106b. If the building control device is in bootloader or in a diagnostic mode, the light ring may be animated to show a red spot with a trailing red tail rotating around the light ring at a relatively slow rate, as shown at 106c. Finally, if the building control device has been restarted and is currently booting up, the light ring may be animated to show a red spot with a trailing red tail rotating around the light ring at a relatively faster rate, as shown at 106d.

In some case, the light ring may provide an animation that indicates the connectively status of the main controller 20 with one or more of the small input/output modules 30 and/or the large input/output modules 40 as the small input/output modules 30 and/or the large input/output modules 40 are added and/or removed from the building control system 10. For example, when a small input/output modules 30 is added to the system and connected to the main controller 20, the light ring of the main controller 20 and/or the light ring of the small input/output modules 30 may appear to rotate clockwise until connected and then blink (e.g. for 1 second) to indicate the small input/output modules 30 has been successfully connected to the main controller 20. When after the small input/output modules 30 is removed, the light ring of the main controller 20 and/or the light ring of the small input/output modules 30 may rotate counter-clockwise and then blink (e.g. for 1 second) to indicate the small input/output modules 30 has been successfully removed. These are just examples.

As can be seen, it is contemplated that the light ring may change colors between green, yellow, and red to visually indicate to the user the status of the corresponding building controller device, along with an indication of the severity of a fault when a fault is detected. Also, the animation of the light ring may provide additional information to the user to help quickly and intuitively troubleshoot and correct faults within the building control system 10, potentially reducing the cost associated with maintaining the building control system and possibly reducing unwanted downtime of the building control system.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A building control system comprising:
   a master device comprising:
     a housing configured to be mountable to a DIN rail;
     a status indicator housed by the housing of the master device and visible from outside of the housing of the master device, the status indicator of the master device including a light ring and one or more LED indicators spaced from the light ring of the master device;
     a master controller housed by the housing of the master device, the master controller operatively coupled to the light ring and the one or more LED indicators of the master device;
   a slave device comprising:

a housing configured to be mountable to a DIN rail;
an input/output block housed by the housing of the slave device for passing control signals used for controlling one or more building control components of the building control system;
a status indicator housed by the housing of the slave device and visible from outside of the housing of the slave device, the status indicator of the slave device including a light ring and one or more LED indicators spaced from the light ring of the slave device;
a slave controller housed by the housing of the slave device and operatively coupled to the input/output block and the status indicator of the slave device, wherein the slave controller is configured to operate as a slave to the master controller of the master device, with the master device having a higher control rank relative to the slave device in a control hierarchy of the building control system;
the master controller is configured to receive sensor and/or other data, and in response, generate control signals in accordance with a control algorithm, and provide one or more of the generated control signals to the slave controller;
the slave controller, in response to receiving one or more of the generated control signals from the master controller, is configured to provide one or more control signals to one or more building control components of the building control system via the input/output block of the slave device to at least partially control one or more building control components of the building control system;
the light ring of the master device is dimensioned physically larger than the light ring of the slave device to convey to a user that the master device has a higher control rank relative to the slave device in the control hierarchy of the building control system;
the master controller is configured to identify a current status of the master device, wherein the current status can indicate: (1) no faults are identified that require user action: (2) non-critical faults are identified that require user action; and (3) critical faults are identified that require urgent user action;
the master controller of the master device is further configured to animate the light ring of the master device with one or more animations to provide information regarding the current status of the master device;
the slave controller is configured to identify a current status of the slave device, wherein the current status can indicate: (1) no faults are identified that require user action: (2) non-critical faults are identified that require user action; and (3) critical faults are identified that require urgent user action; and
wherein the slave controller of the slave device is further configured to animate the light ring of the slave device with one or more animations to provide information regarding the current status of the slave device.

2. The building control system of claim 1, wherein the light rings of the master device and slave device are both toroidal in shape.

3. The building control system of claim 1, wherein the light rings of the master device and slave device are both continuous non-interrupted light rings.

4. The building control system of claim 1, wherein at least one of the one or more animations of the slave device comprises repeatedly cycling the light intensity of the light ring of the slave device.

5. The building control system of claim 4, where each cycle includes progressively increasing the light intensity of the light ring of the slave device followed by progressively decreasing the light intensity of the light ring of the slave device, emulating a breathing pattern.

6. The building control system of claim 1, wherein at least one of the one or more animations of the slave device comprises repeatedly cycling the light intensity of the light ring of the slave device where each cycle includes turning on the light ring of the slave device, followed by turning off the light ring of the slave device, emulating a flashing pattern.

7. The building control system of claim 1, wherein at least one of the one or more animations of the slave device comprises rotating the lighted portion of the light ring of the slave device around the light ring of the slave device in a clockwise direction.

8. The building control system of claim 1, wherein at least one of the one or more animations of the slave device comprises rotating the lighted portion of the light ring of the slave device around the light ring of the slave device in a counter-clockwise direction.

9. The building control system of claim 1, wherein at least one of the one or more animations of the slave device comprises rotating the lighted portion of the light ring of the slave device around the light ring of the slave device at a first rotation speed.

10. The building control system of claim 9, wherein at least one of the one or more animations of the slave device comprises rotating the lighted portion of the light ring of the slave device around the light ring of the slave device at a second rotation speed.

11. The building control system of claim 1, wherein at least one of the one or more animations of the slave device comprises rotating the lighted portion of the light ring of the slave device around the light ring of the slave device, followed by flashing the light ring of the slave device on and then off.

12. The building control system of claim 1, wherein the input/output block of the slave device includes two or more wiring terminals, wherein the two or more wiring terminals corresponding to an analog input, a digital input, an analog output or a digital output, and wherein one or more of the LED indicators of the status indicator of the slave device indicate a status of a corresponding one of the wiring terminals of the input/output block of the slave device.

13. A building control system comprising:
a first device comprising a first housing configured to be mountable to a DIN rail, a first controller, and a first status indicator visible from outside of the first housing, the first status indicator including a first light ring and the one or more first LED indicators;
a second device, the second device comprising:
a second housing configured to be mountable to a DIN rail;
a second status indicator visible from outside of the second housing, the second status indicator including a second light ring and the one or more second LED indicators;
a second controller housed by the second housing and operatively coupled to the second status indicator;
the second controller is operatively couplable to the first controller of the first device, and wherein the second controller is configured to operate as a slave to the first controller of the first device, with the first device having a higher control rank relative to the second device in a control hierarchy of the building control system;

the second controller of the second device is configured to select an animation of the second light ring from two or more animations to convey information regarding a current status of the second device;

the first controller is configured to receive sensor and/or other data, and in response, generate control signals in accordance with a control algorithm, and provide one or more of the generated control signals to the second controller;

the second controller, in response to receiving one or more of the generated control signals from the first controller, is configured to provide one or more control signals to one or more building control components of the building control system to at least partially control one or more building control components of the building control system;

the first controller is configured to identify a current status of the first device, and animate the light ring of the first device with one or more animations to provide information regarding the current status of the first device;

the second controller is configured to identify a current status of the second device, and animate the light ring of the second device with one or more animations to provide information regarding the current status of the second device; and the light ring of the first device is dimensioned physically larger than the light ring of the second device to convey to a user that the first device has a higher control rank relative to the second device in the control hierarchy of the building control system.

14. The building controller system of claim 13, wherein the second controller is configured to select a speed of the selected animation to convey information regarding the current status of the second device.

15. The building controller system of claim 13, wherein the second controller is configured to select a color from two or more colors to convey information regarding the current status of the second device.

16. A modular building control system, comprising:

a first device having a first housing and a first status indicator visible from outside of the first housing, the first status indicator including a first light ring;

a second device having a second housing and a second status indicator visible from outside of the second housing, the second status indicator including a second light ring;

wherein the second device can be selectively operatively connected to the first device;

the second device is configured to operate as a slave to the first device, with the first device having a higher control rank relative to the second device in a control hierarchy of the building control system;

the first device is configured to receive sensor and/or other data, and in response, generate control signals in accordance with a control algorithm, and provide one or more of the generated control signals to the second device;

the second device, in response to receiving one or more of the generated control signals from the first device, is configured to provide one or more control signals to one or more building control components of the modular building control system to at least partially control one or more building control components of the modular building control system;

the first device is configured to select an animation and/or color for the first light ring to convey information regarding a current status of the first device including a connection status to the second device, and the second device is configured to select an animation and/or color for the second light ring to convey information regarding a current status of the second device including a connection status with the first device; and the light ring of the first device is dimensioned physically larger than the light ring of the second device to convey to a user that the first device has a higher control rank relative to the second device in the control hierarchy of the building control system.

17. The modular building control system of claim 16, wherein the first device and the second device are configured to be mounted to a common DIN rail with the first device and the second device in operative communication.

\* \* \* \* \*